US008163418B1

(12) United States Patent
Cardenas-Valencia et al.

(10) Patent No.: US 8,163,418 B1
(45) Date of Patent: Apr. 24, 2012

(54) METHOD OF CONTROLLED DELIVERY FOR USE IN ELECTROCHEMICAL POWER SOURCES

(75) Inventors: Andres M. Cardenas-Valencia, Tampa, FL (US); Norma A. Alcantar, Tampa, FL (US); Xiaoling Ding, Xiaoling, FL (US); Ryan G. Toomey, Tampa, FL (US); Lawrence C. Langebrake, Seminole, FL (US)

(73) Assignee: University of South Florida, Tampa, FL (US)

(*) Notice: Subject to any disclaimer, the term of this patent is extended or adjusted under 35 U.S.C. 154(b) by 769 days.

(21) Appl. No.: 12/268,772

(22) Filed: Nov. 11, 2008

Related U.S. Application Data

(63) Continuation-in-part of application No. 11/958,841, filed on Dec. 18, 2007, now Pat. No. 7,943,259.

(60) Provisional application No. 60/870,514, filed on Dec. 18, 2006.

(51) Int. Cl.
 *H01M 6/30* (2006.01)
 *H01M 4/36* (2006.01)
(52) U.S. Cl. ........ 429/110; 429/118; 429/122; 429/206; 429/219
(58) Field of Classification Search .................. None
 See application file for complete search history.

(56) References Cited

U.S. PATENT DOCUMENTS

| | | | |
|---|---|---|---|
| 2004/0038128 A1* | 2/2004 | Stanish et al. | 429/213 |
| 2006/0264804 A1* | 11/2006 | Karmon et al. | 604/20 |
| 2008/0004564 A1* | 1/2008 | Smith | 604/20 |

* cited by examiner

*Primary Examiner* — John S Maples
(74) *Attorney, Agent, or Firm* — Molly L. Sauter; Smith & Hopen, P.A.

(57) ABSTRACT

A system and method for improving electrochemical power sources through the dispensing, encapsulation and dispersion into galvanic chambers of an electrochemical cell. Features of the method include the optimization of the concentration levels of chemicals involved in desired energy producing reactions.

17 Claims, 5 Drawing Sheets

METHOD OF CONTROLLED DELIVERY FOR USE IN ELECTROCHEMICAL POWER SOURCES

CROSS-REFERENCE TO RELATED APPLICATIONS

This application is a continuation-in-part of U.S. Nonprovisional patent application Ser. No. 11/958,841, now U.S. Pat. No. 7,943,259, filed by the same inventors on Dec. 18, 2007, which claims priority to expired U.S. Provisional Patent Application No. 60/870,514 filed on Dec. 18, 2006.

STATEMENT OF GOVERNMENT INTEREST

This invention was made with government support under grant number DASG60-00-C-0089 awarded by the U.S. Army Space and Missile Defense Command (SMDC). The government has certain rights in the invention.

BACKGROUND

Electrochemical power sources are the power source of choice for portable devices. It is known that long-term operation with attractive power/voltage outputs of electrochemical power sources is enhanced via the use of peripherals that provide either continuous, intermittent or even a single addition of chemicals involved in the energy production. The operations that perform these additions normally require additional energy from external sources. Tapping into surrounding power sources can potentially eliminate or reduce the need of power from a peripheral battery. Other choices to address this problem have been the use of dissolution of solid materials, in-situ production of chemical via the addition of common materials, such as water, to control the release of chemicals involved in the energy producing reactions.

However, certain electrochemical power sources use materials that either are not solid or simply do not dissolve in an appropriate manner over time to allow a more precise level of control to improve galvanic reactions.

The emerging technology of encapsulated nanoparticles plays a critical role in the development of delivery systems for various industrial and practical applications due to the versatility, control, and future potential of the design of these systems. A commonly used power generation technique involves aluminum as a battery anode. In this technology, however, it is difficult to control the release of the chemicals, which then lowers the efficiency of the overall power system. Additionally, it is necessary to control the production of energy efficiently to provide longer battery lifetimes.

Accordingly, what is needed in the art is an improved method and system for the controlled release of the chemicals necessary for energy production in an electrochemical cell.

SUMMARY OF INVENTION

The present invention provides a system and method of improving electrochemical power sources through controlled dispensing of materials necessary for energy production in an electrochemical cell.

In accordance with the present invention, a system that will overcome the deficiencies of the current technology is the use of a control mechanism for the release of chemicals is provided. In on embodiment, this system is based on encapsulating chemicals in liposomes (small vesicles), which are embedded in a polymer matrix made of hydrogel materials. By controlling the hydrogel network structure and the liposomes concentration, it is possible to tune release rates of chemicals to enhance galvanic systems and its energy dosage. In addition, this system has the advantage of being environmentally friendly, as the materials that the packaging technology uses are biodegradable.

The present invention provides an energy-delivery vehicle that utilizes a double controlled mechanism that is based on a package within a package system, or a smart-packaging system. The chemical that participates in an electrochemical reaction to produce power ($H_2O_2$) is encapsulated in non-ionic surfactant vesicles, or liposomes, and then embedded in a biodegradable temperature- and pH-sensitive chitosan polymer hydrogel. This double packaging system will allow for the controlled release of chemicals based on the diffusion properties and physical characteristics of the liposomes and chitosan hydrogel. Once the release occurs, a chemical reaction between the encapsulated chemical and the NaOH will occur producing ionized species that then will produce a difference in voltage in the Al electrodes.

In one embodiment of the invention, a method of controlling energy producing chemical reactions in a galvanic electrochemical power sources comprising, positioning a dissolvable capsule encapsulating a solid material into an energy producing reaction chamber of the electrochemical power source and causing the dissolvable capsule to dissolve and initiate a controlled energy producing chemical reaction in the reaction chamber of the electrochemical power source. With this method, dissolving of the capsule results in a controlled release of the encapsulated solid material into the reaction chamber.

In a particular embodiment, the solid material is solid sodium peroxide and the dissolvable capsule is a gelatin capsule. However, other materials and capsule materials are within the scope of the present invention.

In an additional embodiment, a system for controlling energy producing chemical reactions in a galvanic electrochemical power source is provided, including an electrochemical power source having a reaction chamber and a dissolvable capsule encapsulating a solid material positioned within the reaction chamber.

In another embodiment, a system and method of controlling energy producing chemical reactions in a microbial fuel cell is provided which comprises positioning a hydrogel incorporated with organic matter within a reaction area of the microbial fuel cell and causing the incorporated organic matter to disperse from the hydrogel and initiate a controlled energy producing chemical reaction in the reaction area of the microbial fuel cell.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides several embodiments of the invention in which the use of low cost and environmentally friendly materials are used to enhance the power/energy output of several galvanic cells. A first embodiment includes a controlled delivery of a solid chemical in an electrochemical cell. A second embodiment includes a microbial fuel cell with controlled dispersion and release of organic matter from a hydrogen matrix which enhances the power output of the microbial fuel cell. A third embodiment includes the controlled delivery of a reactant into an electrochemical cell employing liposomes or niosomes. These embodiments can be combined together, as well as with other encapsulation and dispersing techniques known in the art.

In a particular embodiment, the controlled release of the chemicals involved in the energy production of an electrochemical cell can be performed with the use of materials and matrixes that can either encapsulate and/or disperse the chemicals of interest. The proposed encapsulation schemes and/or chemical dispersion matrices schemes are amiable to large mass production, are cost effective and provide a clear benefit to several types of power sources. Power source manufacturers and users of the cells described here could potentially commercialize this type of enhanced power source technology. Improvements in the art provided by the proposed power sources in accordance with the present invention lie within the power/energy density output as well as in the environmental friendliness of the systems presented.

A specific embodiment of the present invention involves the dissolution of a capsule in which a solid has been trapped. In is known in the art that dissolvable gelatin capsules can control the release of the material within the capsule as the capsule dissolves such that the release can be made at a rate controlled by using such capsules. In a particular embodiment, solid sodium peroxide was encapsulated using commercial capsules for a food supplement, such as a gelatin capsule.

Figure 1:
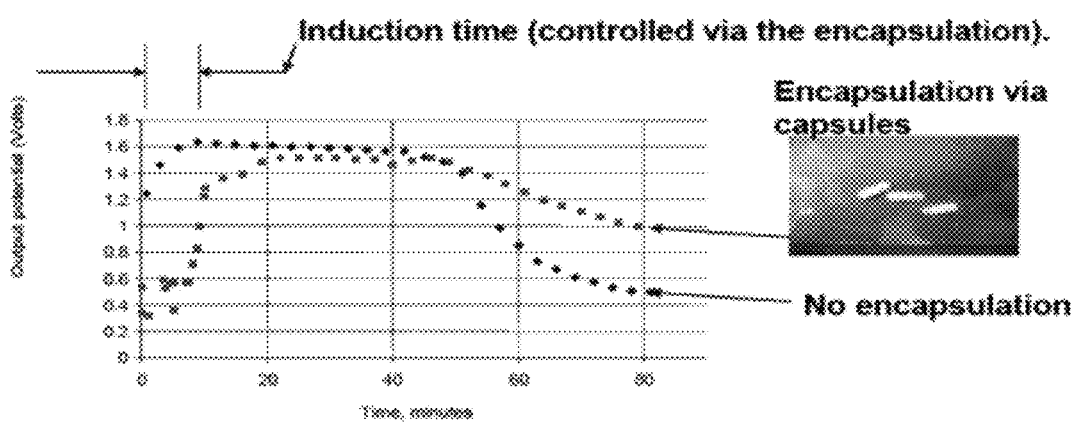
FIG. 1 is a graph showing some of the degree of control in the encapsulation of solid sodium peroxide 2 grams and its direct effect on the potential output of a cell. Experiments at a constant load (10 ohms). Aluminum anode and Composite Silver Carbon cathode collector were utilized. 1 M NaOH solution.

FIG. 1 illustrates the results of an exemplary embodiment of the present invention in which a solid sodium peroxide material is encapsulated and then dissolved using a water solution to control the potential output of the electrochemical cell at a constant load. In this embodiment, the electrochemical includes an aluminum anode and a composite silver carbon cathode.

A microbial fuel cell (MFC) or biological fuel cell is a bio-electrochemical system that drives a current by mimicking bacterial interactions found in nature. In an MFC microorganisms catabolize compounds such as glucose or wastewater. The electrons gained from this oxidation are transferred to an anode, then through an electrical circuit to a cathode. The electrons are then transferred to a high potential electron acceptor such as oxygen. A current flows due to a difference in potential, which results in the generation of power directly from biofuel by the catalytic activity of bacteria.

In an additional embodiment, a hydrogel matrix is used to host powdered matter to enhance the performance of a microbial fuel cell (MFC). A hydrogel is a network of polymer chains that are water-insoluble, sometimes found as a colloidal gel in which water is the dispersion medium.

In an exemplary embodiment, two carbon cloths were used as the electrodes of the MFC. The anode was buried in the sediments and a planar hydrogel matrix was placed on top of the anode. The cathode was held on top of the anode and positioned about 10 centimeters away from the sediment layer.

To provide the organic matter, Blue Runners caught from Tampa Bay were boiled and the meat was separated and then dried in an oven. After completely dried, the meat was ground and passed through a 250 nm sieve and then stored in a refrigerator before use. To provide the hydrogel, 80 mL of water was added into a mixture of 4 g of monomer N-isopropylacrylamide, 160 mg of N,N-methylenebisacrylamide as a crosslinking agent, 10 mg of ammonium persulphate as an initiator and 0.2 g of dried fish powder as the organic matter. The solution was flushed with $N_2$ for 5 min or until the monomer dissolved. The mixture was under ultrasonication for 5 min for the purpose of mixing. Then, 50 μL of TEMED was added as an accelerator. The solution was flushed with $N_2$ for 1 min. The solution was sealed for 1 hour at room temperature for polymerization.

Figure 2:
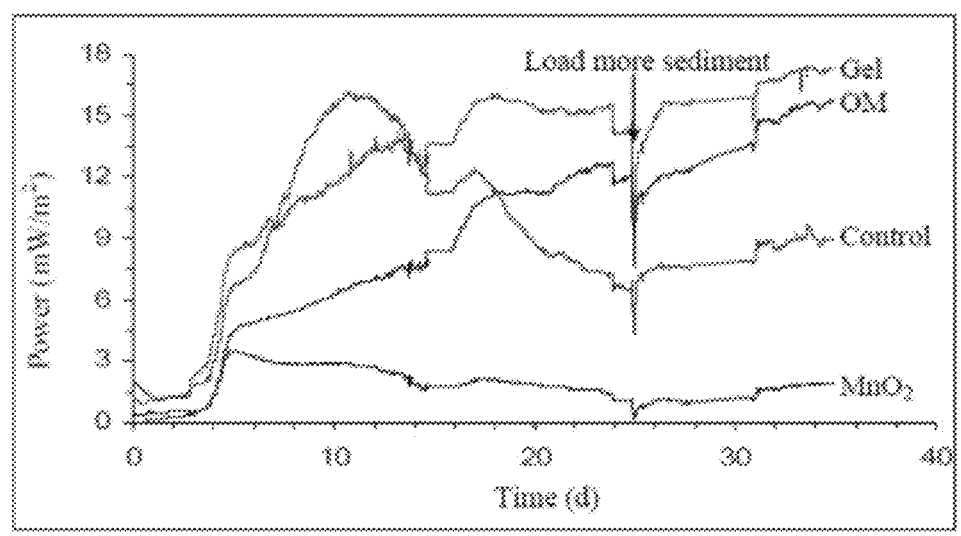
FIG. 2 is a graph showing hydrogels incorporated with dried fish powder and $MnO_2$ inside and nothing are labeled as: OM, $MnO_2$ and Gel, correspondingly.

The results of the hydrogel matrix incorporating organic matter are shown in FIG. 2. The hydrogels incorporated with dried fish powder and $MnO_2$ inside and nothing are labeled as: OM, $MnO_2$ and Gel, correspondingly. The systems with hydrogels were compared with a control one that did not use hydrogel. The results are the average between duplicated samples. It can be seen that the hydrogen matrix incorporating organic matter is accordance with the present invention improves the output of the microbial fuel cell.

In an additional embodiment of the present invention, the controlled delivery of $H_2O_2$ for reaction with NaOH using a liposome/hydrogel "smart system" for galvanic cells is presented. In this embodiment, $H_2O_2$ is encapsulated using liposomes or niosomes. The liposomes are then encapsulated in a polymer network to control the release of $H_2O_2$ into an electrochemical cell.

In an exemplary embodiment, the liposomes were prepared by thin film hydration and sonication, and 5(6)-carboxyfluorescein dye was encapsulated in the vesicles of the liposomes to mimic the release of the $H_2O_2$ into a NaOH solution. The initial concentration of the dye was 3.7 mM.

Figure 3:
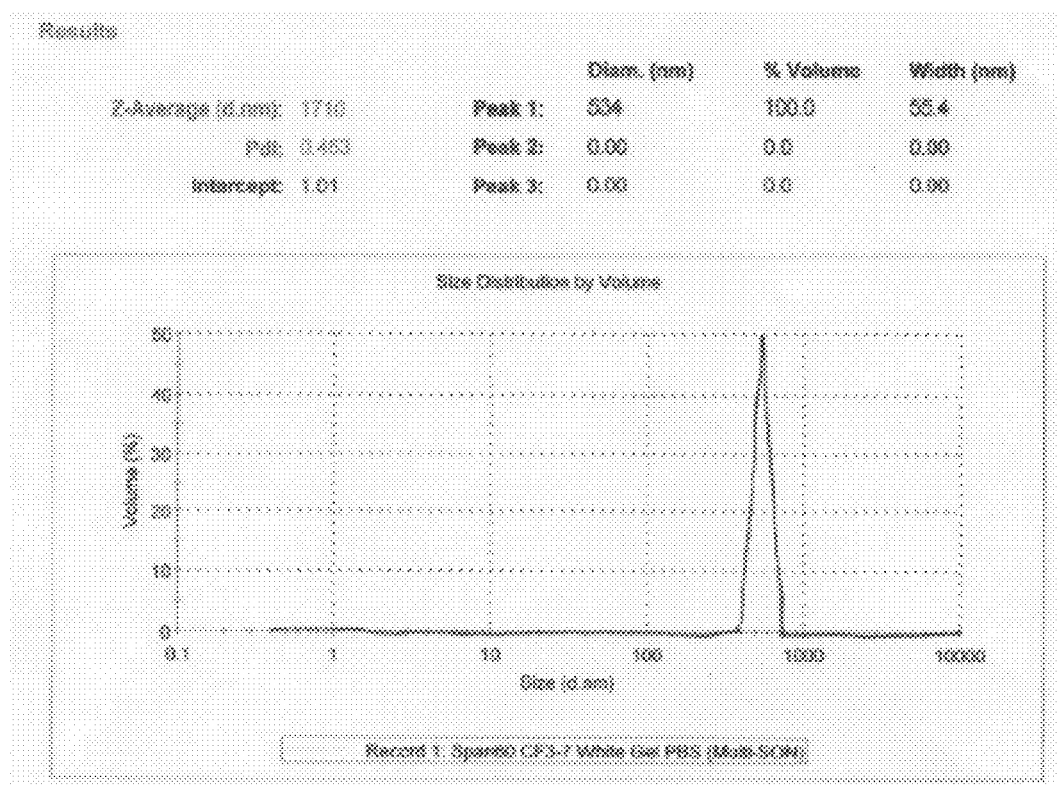
FIG. 3 is a graphical illustration of the size distribution report by volume fore liposomes. The conditions of the measurement were 25° C. using 71.5 kcps (count rate) for 100 sec. The sample is a solution of liposomes in PBS at 1% v.
Figure 4:
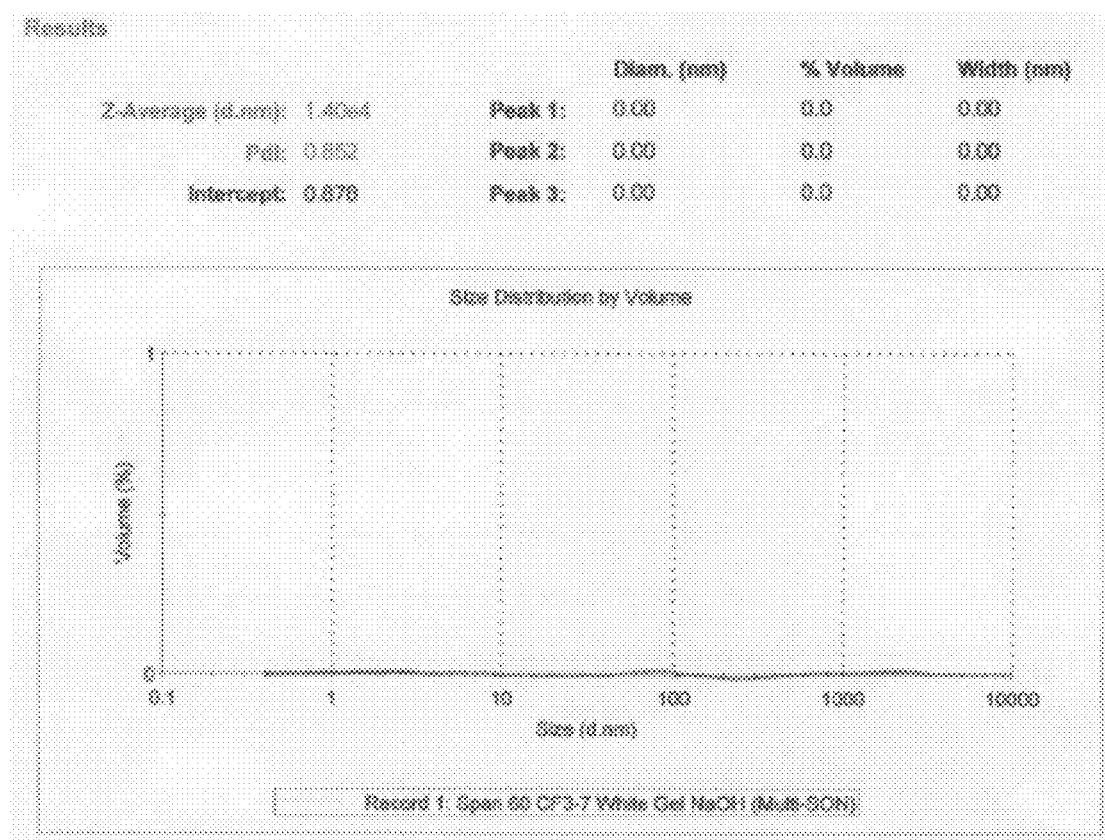
FIG. 4 is a graphical illustration of the size distribution report by volume for liposomes in NaOH($_l$). The conditions of the measurement were 25° C. using 53.1 kcps (count rate) for 120 sec. The concentration of this solution is also 1% v liposomes-NaOH.

Two samples were prepared. The first sample consisted of 990 μl of PBS and 10 μl of the liposome's solution (identify as the white gel). The two were mixed and three-200 μl samples were pipetted into a well plate. The second sample consisted of 990 μl of NaOH and 10 μl of the white gel solution. The two were mixed and three-200 μl samples were pipetted into the same well plate as the first sample. A fluorescence spectrometer was used to measure the intensity of each sample. The average intensity of the first sample (PBS+white gel) was 663.3. If the encapsulated dye is released from the liposomes systems in PBS (inert solution), the intensity should go up, since there would be a lot more dye available in the solution. Our data corroborates this finding; we have measured that the intensity is usually 2.5 higher if all the dye is released from the liposomes in an inert solution. However, the average intensity of the second sample (NaOH+white gel) was 324.0. Additionally, Dynamic Light Scattering (DLS) was used to determine the size of the liposomes in each solution. Two samples were prepared. The first sample consisted of 1980 μl of PBS and 20 μl of the white gel solution. The two were mixed and 1.5 ml were withdrawn and placed in the DLS machine. The results indicate that there is one peak present with a diameter of 534+/−55 nm. This corresponds to the average size of the liposomes in PBS, as shown in FIG. 3. The second sample consisted of 1980 μl NaOH and 20 μl of the white gel solution. The two were mixed and 1.5 ml were withdrawn and placed in the DLS machine. The results indicate that there are no peaks present in that sample, as shown in FIG. 4.

These results reveal two important findings. On one hand, the liposomes will burst once they come in contact with the NaOH bulk solution and the encapsulated chemical will be released immediately (as shown in FIG. 4), indicating their instability in that environment. On the other hand, the encapsulated chemical (dye) has reacted with NaOH as expected by reducing its intensity by half, which corroborates that a chemical reaction has occurred between the bulk electrochemical solution and the chemical encapsulated in the liposomes.

Figure 5:
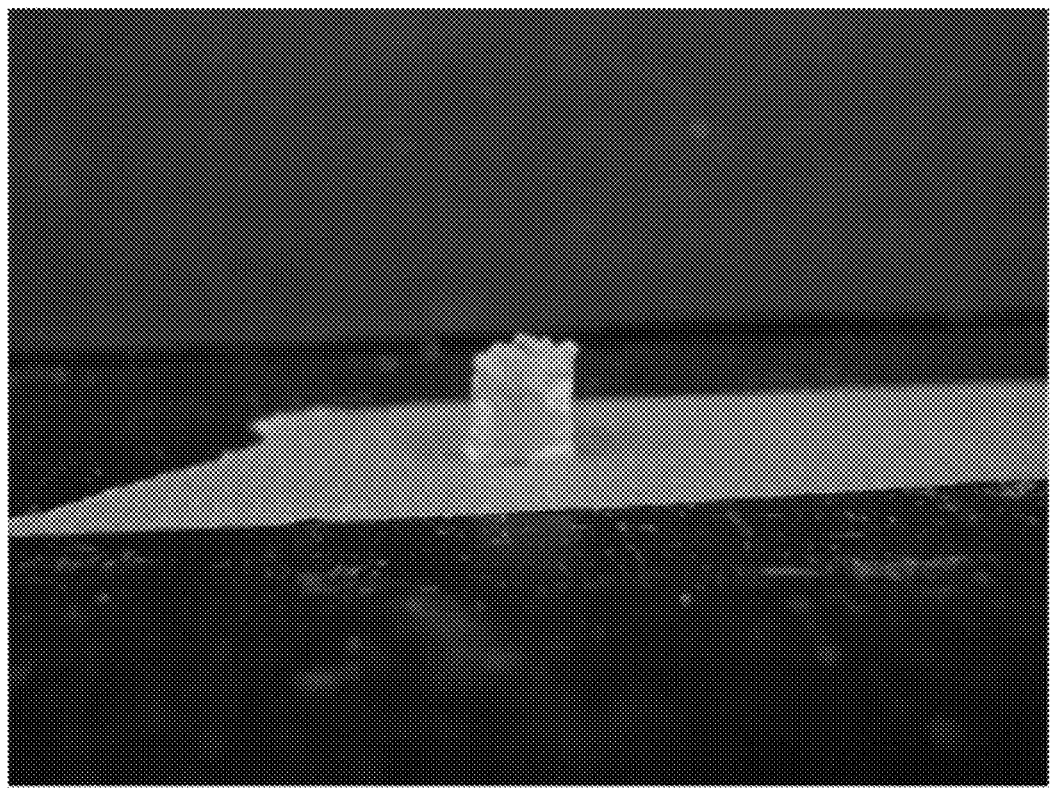
FIG. 5 Illustrates the fluorescence dye-liposomes encapsulated in a poly-isopropyl acrylamide hydrogel network in accordance with an embodiment of the present invention.

Another finding that connects to this embodiment is shown in FIG. 5, which illustrates fluorescently labeled liposomes that have been encapsulated in a polymer network. Usually the pure polymer network presents a transparent. The fact that the polymer network in FIG. 5 shows a yellow color, indicates that the liposomes with a dye were successfully incorporated into the hydrogel network.

As such, in this embodiment, the chemical that participates in an electrochemical reaction to produce power ($H_2O_2$) is encapsulated in non-ionic surfactant vesicles, or liposomes, and then embedded in a biodegradable temperature- and pH-sensitive chitosan polymer hydrogel. This double packaging system will allow for the controlled release of chemicals based on the diffusion properties and physical characteristics of the liposomes and chitosan hydrogel. Once the release occurs, a chemical reaction between the encapsulated chemical and the NaOH will occur producing ionized species that then will produce a difference in voltage in the Al electrodes.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of controlling energy producing chemical reactions in a galvanic electrochemical power source, the method comprising:
    positioning a polymer hydrogel encapsulating non-ionic surfactant vesicles having an encapsulated chemical into an energy producing reaction chamber of the electrochemical power source;
    causing the polymer hydrogel to release the non-ionic surfactant vesicles; and
    causing the non-ionic surfactant vesicles to release the encapsulated chemical to initiate a controlled energy producing chemical reaction in the reaction chamber of the electrochemical power source.

2. The method of claim 1, wherein the polymer hydrogel is a poly-isopropyl acrylamide hydrogel.

3. The method of claim 1, wherein the encapsulated chemical is $H_2O_2$.

4. The method of claim 1, wherein the non-ionic surfactant vesicle is a liposome.

5. The method of claim 1, wherein the non-ionic surfactant vesicle is a noisome.

6. The method of claim 1, wherein the polymer hydrogel a biodegradable temperature-sensitive and pH-sensitive chitosan hydrogel.

7. The method of claim 1, wherein the reaction chamber of the electrochemical cell comprises an NaOH solution for reaction with the released chemical.

8. The method of claim 1, wherein the galvanic electrochemical power source further comprises an aluminum anode and a composite silver carbon cathode.

9. The method of claim 1, wherein initiating a controlled energy producing chemical reaction in the reaction chamber of the electrochemical power source further comprises, initiating a chemical reaction between the encapsulated chemical and an NaOH solution in the reaction chamber to produce ionized species that then will produce a difference in voltage in an electrode in the reaction chamber.

10. A system for controlling energy producing chemical reactions in a galvanic electrochemical power source, the system comprising:
    an electrochemical power source having a reaction chamber; and
    a polymer hydrogel encapsulating non-ionic surfactant vesicles having an encapsulated chemical to be positioned within the reaction chamber.

11. The system of claim 10, wherein the polymer hydrogel is a poly-isopropyl acrylamide hydrogel.

12. The system of claim 10, wherein the encapsulated chemical is $H_2O_2$.

13. The system of claim 10, wherein the non-ionic surfactant vesicle is a liposome.

14. The system of claim 10, wherein the non-ionic surfactant vesicle is a niosome.

15. The system of claim 10, wherein the polymer hydrogel is a biodegradable temperature-sensitive and pH-sensitive chitosan hydrogel.

16. The system of claim 10, wherein the reaction chamber of the electrochemical cell comprises an NaOH solution.

17. The system of claim 10, wherein the galvanic electrochemical power source further comprises an aluminum anode and a composite silver carbon cathode.

* * * * *